(12) United States Patent
Guillot et al.

(10) Patent No.: US 10,605,629 B2
(45) Date of Patent: Mar. 31, 2020

(54) CONTACTLESS ANGULAR SENSOR

(71) Applicant: SAFRAN ELECTRONICS & DEFENSE, Boulogne Billancour (FR)

(72) Inventors: François Guillot, Boulogne Billancourt (FR); Thierry Bickard, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/349,926

(22) PCT Filed: Oct. 27, 2017

(86) PCT No.: PCT/EP2017/077699
§ 371 (c)(1),
(2) Date: May 14, 2019

(87) PCT Pub. No.: WO2018/086920
PCT Pub. Date: May 17, 2018

(65) Prior Publication Data
US 2019/0316937 A1 Oct. 17, 2019

(30) Foreign Application Priority Data

Nov. 14, 2016 (FR) ...................................... 16 61010

(51) Int. Cl.
*G01D 5/241* (2006.01)
(52) U.S. Cl.
CPC .................................. *G01D 5/2415* (2013.01)
(58) Field of Classification Search
CPC ...... G01R 31/06; G01R 31/346; G01R 33/26; G01R 33/24; G01R 33/032; G01R 27/2605; A61B 5/0515; G01N 24/006; G06F 3/0428; G06F 3/044; G06F 3/0441; G06F 3/0442; G06F 3/0443; G06F 3/0444;

(Continued)

(56) References Cited

U.S. PATENT DOCUMENTS

2004/0032255 A1  2/2004  Berndt
2017/0070177 A1* 3/2017  Dumas ................. H02P 29/024
2019/0195941 A1* 6/2019  Winer ...................... G01D 3/08

FOREIGN PATENT DOCUMENTS

EP  1918679 A2  5/2008
GB  2508924 A   6/2014

* cited by examiner

*Primary Examiner* — Tung X Nguyen
(74) *Attorney, Agent, or Firm* — Muncy, Geissler, Olds & Lowe, P.C.

(57) ABSTRACT

A sensor for sensing angular movement of an object with a structure. Mounted on the structure are a stationary first portion and a second portion that is movable in rotation carrying respectively a first printed circuit and a second printed circuit centered on the axis of rotation and that face each other and that include conductive areas for forming capacitive sectors and, respectively, a primary excitation winding and a secondary excitation winding connected to the conductive areas of the second printed circuit; the first printed circuit being connected to an electronic control circuit arranged to create excitation signals that are transmitted by the first printed circuit to the second printed circuit by magnetic coupling, and to demodulate signals transmitted by the second printed circuit to the first printed circuit by capacitive coupling.

7 Claims, 2 Drawing Sheets

(58) Field of Classification Search
CPC .... G06F 3/0445; G06F 3/0446; G06F 3/0447; G06F 3/0448
See application file for complete search history.

CONTACTLESS ANGULAR SENSOR

BACKGROUND OF THE INVENTION

Field of the Invention

The present invention relates to contactlessly sensing an angular movement parameter, such as the position or the speed of an object that is movable in rotation. More particularly, the invention relates to detecting the angular position or the angular velocity of a landing gear wheel.

Brief Description of the Related Art

There exist numerous angular movement sensors that serve to determine the speed or the position of a rotating object, and in particular: tachometer generators in which the voltage is proportional to the speed of rotation, optical angle encoders, resolvers, . . . .

Nevertheless, those sensors present at least one of the following drawbacks: they are subject to wear, leading to relatively fast degradation of their reliability or accuracy, they are of a mechanical or an electronic structure that is relatively complex and thus expensive, they are sensitive to operating conditions, such as temperature or vibration.

SUMMARY OF THE INVENTION

An object of the present invention is to propose a sensor of structure that is simple and that presents a lifetime that is relatively long.

To this end, the invention provides a sensor for sensing angular movement of an object, the sensor comprising a structure having mounted thereon a stationary first portion and a second portion that is movable in rotation relative to the first portion and that is to be coupled in rotation with the object, the first portion and the second portion carrying respectively a first printed circuit and a second printed circuit that face each other and that include conductive areas for forming capacitive sectors and, respectively, a primary excitation winding and a secondary excitation winding. The windings and the conductive areas are centered on the axis of rotation of the second portion and are arranged respectively to create magnetic and capacitive couplings between the first printed circuit and the second printed circuit. The first printed circuit is connected to an electronic control circuit arranged to create excitation signals that are transmitted by the first printed circuit to the second printed circuit by magnetic coupling, and to demodulate signals transmitted by the second printed circuit to the first printed circuit by capacitive coupling.

Thus, the first printed circuit and the second printed circuit communicate via magnetic coupling and capacitive coupling so there is no contact between the stationary portion and the movable portion. This limits any risk of wear. In addition, such a structure presents little drift because of variations in temperature. The sensor is also relatively easy to fabricate and does not require complicated adjustments.

In a second particular embodiment, the first printed circuit comprises two conductive areas that extend radially and that are diametrically opposite each other and the second printed circuit comprises an outer common track and an inner common track that are of circular shape centered on the axis of rotation of the second portion, and the conductive areas of the second printed circuit comprise first conductive areas extending radially from the outer common track and second conductive areas extending radially from the inner common track in alternation with the first conductive areas in such a manner that each of the first conductive areas is diametrically opposite one of the second conductive areas.

The arrangement of the conductive areas forming the capacitive sectors provides for alternating measurement signals that are in-phase and anti-phase depending on the relative angular position between the first printed circuit and the second printed circuit. This enables measurement signals to be obtained that are of relatively large amplitude, thereby facilitating processing.

BRIEF DESCRIPTION OF THE DRAWINGS

Other characteristics and advantages of the invention appear on reading the following description of a particular, non-limiting embodiment of the invention.

Reference is made to the accompanying drawings, in which.

DETAILED DESCRIPTION OF THE PREFERRED EMBODIMENTS

Figure 1:
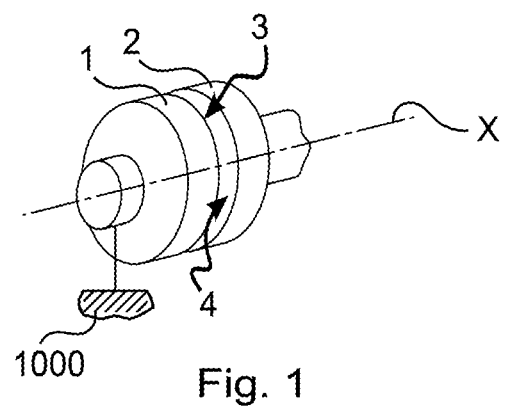
FIG. 1 is a diagrammatic perspective view of a sensor in accordance with the invention.
Figure 2:
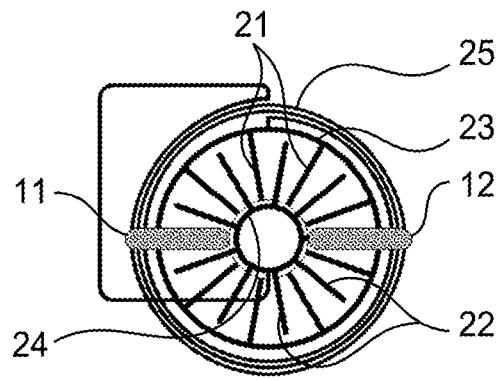
FIG. 2 is a front view showing the first printed circuit superposed on the second printed circuit.
Figure 3:
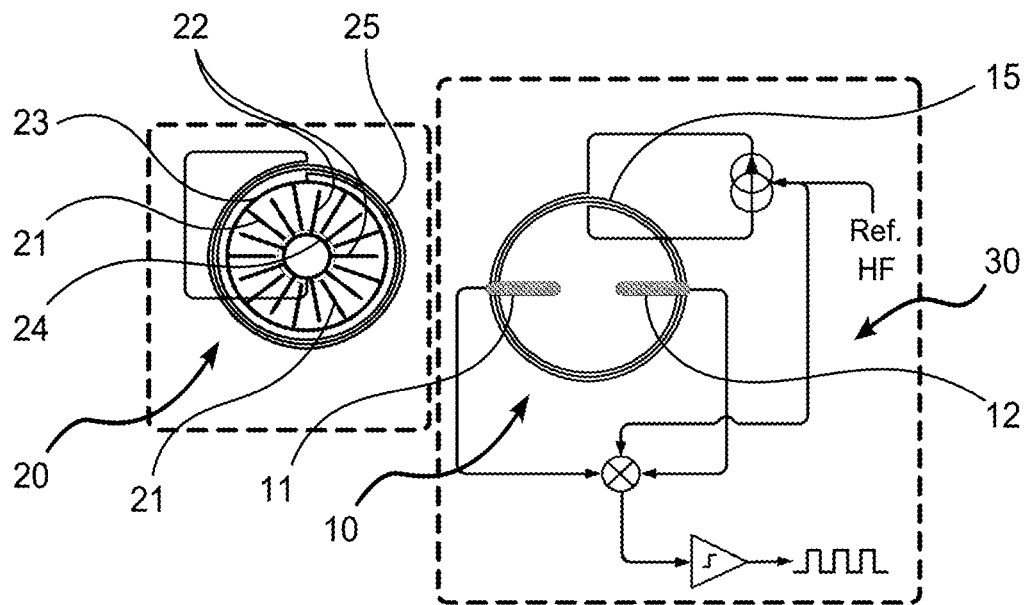
FIG. 3 is a simplified schematic view of the overall electrical circuit of the sensor.
Figure 4:
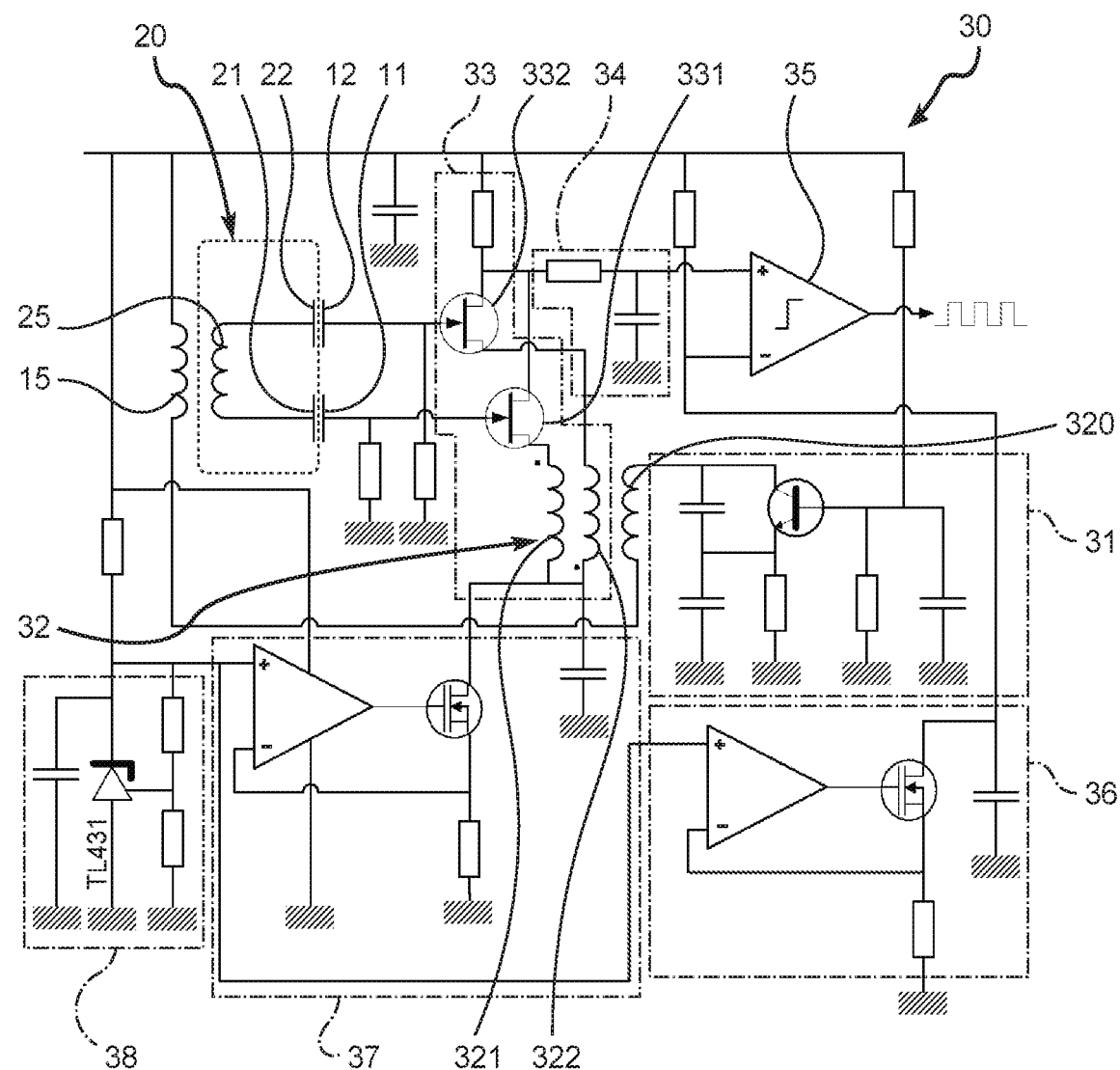
FIG. 4 is a circuit diagram of the electronic circuit for controlling the sensor.

With reference to the figures, the invention comprises an angular movement sensor comprising a structure 1000 having mounted thereon a fixed first portion 1 and a second portion 2 that is movable in rotation relative to the first portion 1. The second portion 2 is for rotatably connecting to the object presenting angular movement that is to be measured, e.g. a vehicle wheel. The first portion 1 and the second portion 2 in this example are in the form of disks having the same diameter and on the same axis.

The first portion 1 and the second portion 2 have mutually facing faces 3 and 4 that carry respectively a first printed circuit and a second printed circuit given overall references 10 and 20.

The first printed circuit 10 comprises a primary excitation winding 15 in the form of a flat coil extending at the periphery of the first portion 1 together with two conductive areas 11, 12 of elongate shape extending radially relative to the axis of rotation X and diametrically opposite each other. The primary excitation winding 15 and the conductive areas 11 and 12 are centered on the axis of rotation X of the second portion 2.

The second printed circuit 20 comprises:
  a secondary excitation winding 25 in the form of a flat coil that extends at the periphery of the second portion 2;
  first conductive areas 21 of elongate shape that extend radially from a common outer track 23 so that each forms a capacitive sector with each of the conductive areas 11, 12 when they are face to face; and
  second conductive areas 22, of elongate shape, extending radially from a common inner track 24 so that each forms a capacitive sector with each of the conductive areas 11, 12 when they are face to face.

The outer common track 23 and the inner common track 24 are circular in shape and centered on the axis of rotation X of the second portion 2. The outer common track 23 is connected to a first end of the secondary excitation winding 25, and the inner common track 24 is connected to a first end of the secondary excitation winding 25.

The first conductive areas 21 alternate with the second conductive areas 22 in such a manner that each conductive area 21 is diametrically opposite one of the second conductive areas 22. The first conductive areas 21 are spaced apart in pairs by about 40° and thus the second conductive areas 22 are likewise spaced apart in pairs by about 40°. Each first conductive area 21 is spaced by 20° relative to two second conductive areas 22 on either side thereof, and vice versa.

The first printed circuit 1 is connected to an electronic control circuit 30 that is arranged to create excitation signals that are transmitted by the first printed circuit 1 to the second printed circuit 2 by a magnetic coupling, and to demodulate measurement signals transmitted by the second printed circuit 2 to the first printed circuit 1 by capacitive coupling.

The electronic control circuit 30 comprises:
- an auto-oscillator 31 connected to a primary 320 of a transformer 32 and to the primary excitation winding 15; and
- a synchronous demodulator 33 having inputs connected to the conductive areas 11, 12, and an output connected via a filter 34 to the positive input of an output comparative 35 having a negative input connected to the first circuit portion 36 supplying a first reference current.

The synchronous demodulator 33 has two transistors 331 and 332, each having a gate connected to a respective conductive area 11, 12, a drain connected to one end of a respective secondary 321, 322 of the transformer 32, and a source connected to the positive input of the output comparator 35. The opposite ends of the secondaries 321, 322 are connected to a second circuit portion 37 supplying a second reference current.

The circuit portions 36 and 37 form two reference current sources for defining quiescent points for the transistors 331, 332 of the demodulator 33 and the thresholds of the output comparator 35.

The electronic control circuit 30 also has a regulated voltage source 38 powering the entire electronic control circuit 30.

The transformer 32 serves to synchronize the synchronous demodulator 30 on the auto-oscillator 31 so as to recover measurement signals of maximum amplitude.

The sensor of the invention associates two modes of coupling: a high frequency magnetic coupling mode for the up path (excitation), and a capacitive coupling mode for the down path (measurement).

The output comparator 35 is arranged to discriminate between high and low logic signals after filtering of the demodulated signal in order to supply a squarewave signal enabling revolutions of the second portion 2 to be counted: specifically, each squarewave corresponds to an angle of 20°, such that sixteen squarewaves correspond to one complete revolution. It is thus possible to count the number of revolutions, and also to determine the angular position of the motor between two revolutions.

Naturally, the invention is not limited to the embodiment described but covers any variant coming within the ambit of the invention as defined by the claims.

In particular, the electronic control circuit may be of a structure that is different from that described, and for example it need not have current sources or a synchronization transformer.

The printed circuit may also be of structure that is different. For example, the second printed circuit may have some other number of conductive areas. The printed circuits may be arranged so that they do not supply two anti-phase measurement signals even though this characteristic is advantageous for having a modulated signal of large amplitude.

The angle difference between the conductive areas of the printed circuits may be less than or greater than the difference specified. The angle difference should be selected as a function of the resolution expected of the sensor and of the fabrication constraints for the printed circuits.

The invention claimed is:

1. A sensor for sensing angular movement of an object, the sensor comprising a structure having mounted thereon a stationary first portion and a second portion that is movable in rotation relative to the first portion and that is to be coupled in rotation with the object, the first portion and the second portion carrying respectively a first printed circuit and a second printed circuit that face each other and that include conductive areas for forming capacitive sectors and, respectively, a primary excitation winding and a secondary excitation winding, connected to the conductive areas of the second printed circuit; the windings and the conductive areas being centered on the axis of rotation of the second portion and being arranged respectively to create magnetic coupling and capacitive coupling between the first printed circuit and the second printed circuit; the first printed circuit being connected to an electronic control circuit arranged to create excitation signals that are transmitted by the first printed circuit to the second printed circuit by magnetic coupling, and to demodulate signals transmitted by the second printed circuit to the first printed circuit by capacitive coupling.

2. The sensor according to claim 1, wherein the first printed circuit has two conductive areas that extend radially and that are diametrically opposite each other.

3. The sensor according to claim 1, wherein the second printed circuit has an outer common track and an inner common track that are of circular shape centered on the axis of rotation of the second portion, and the conductive areas of the second printed circuit comprise first conductive areas extending radially from the outer common track and second conductive areas extending radially from the inner common track in alternation with the first conductive areas in such a manner that each of the first conductive areas is diametrically opposite one of the second conductive areas, each of the common tracks being connected to a respective end of the secondary excitation winding.

4. The sensor according to claim 3, wherein the first conductive areas of the second printed circuit are spaced apart in pairs by about 40°.

5. The sensor according to claim 1, wherein the electronic control circuit comprises an auto-oscillator used for creating the excitation signals, and for synchronous demodulation of the received signals.

6. The sensor according to claim 5, wherein the electronic control circuit comprises a synchronous demodulator having an output connected via a filter to an output comparator arranged to discriminate high and low logic signals after the demodulated signal has been filtered.

7. The sensor according to claim 6, wherein the electronic control circuit comprises two current sources arranged to define quiescent points for transistors of the synchronous demodulator and thresholds for the output comparator.

* * * * *